United States Patent
Wilson et al.

(10) Patent No.: US 6,748,849 B2
(45) Date of Patent: Jun. 15, 2004

(54) BITTERING OF BEER

(75) Inventors: Richard J. H. Wilson, Copthorne (GB); Robert J. Smith, Yakima, WA (US)

(73) Assignee: S.S. Steiner, Inc., New York, NY (US)

( * ) Notice: Subject to any disclaimer, the term of this patent is extended or adjusted under 35 U.S.C. 154(b) by 252 days.

(21) Appl. No.: 09/892,094

(22) Filed: Jun. 26, 2001

(65) Prior Publication Data

US 2002/0018840 A1 Feb. 14, 2002

Related U.S. Application Data

(60) Provisional application No. 60/215,408, filed on Jun. 30, 2000.

(51) Int. Cl.$^7$ .................................................. C12C 3/00
(52) U.S. Cl. ........................... 99/277; 99/278; 99/277.1
(58) Field of Search ..................... 99/276, 277, 277.1, 99/277.2, 278; 426/8, 11, 13, 16, 600

(56) References Cited

U.S. PATENT DOCUMENTS

| | | |
|---|---|---|
| 3,044,879 A | 7/1962 | Koch et al. |
| 3,798,332 A | 3/1974 | Westerman et al. |
| 3,870,810 A * | 3/1975 | Humphrey ................. 426/329 |
| 3,927,802 A | 12/1975 | Lavochkin et al. |
| 4,009,286 A * | 2/1977 | Moll et al. ................ 99/276 X |
| 4,282,259 A | 8/1981 | Wheldon et al. ........... 426/231 |
| 4,324,810 A | 4/1982 | Goldstein et al. ........... 426/600 |
| 4,717,580 A | 1/1988 | Forrest et al. .............. 426/600 |
| 4,759,941 A | 7/1988 | Chicoye et al. ............ 426/600 |
| 4,844,939 A | 7/1989 | Todd, Jr. .................... 426/600 |
| 4,918,240 A | 4/1990 | Todd, Jr. et al. ........... 568/366 |
| 5,013,571 A | 5/1991 | Hay ........................... 426/600 |
| 5,041,300 A | 8/1991 | Todd, Jr. et al. ........... 426/600 |
| 5,200,227 A | 4/1993 | Guzinski et al. ........... 426/600 |
| 5,583,262 A | 12/1996 | Maye et al. ................. 568/377 |
| 5,624,701 A | 4/1997 | Maye et al. ................. 426/600 |
| 5,678,734 A | 10/1997 | Walker |
| 5,874,633 A | 2/1999 | Ting et al. .................. 568/347 |
| 5,917,093 A | 6/1999 | Ting et al. .................. 568/366 |

FOREIGN PATENT DOCUMENTS

| | | |
|---|---|---|
| DE | 2 027 764 | 1/1971 |
| EP | 0 611 168 | 8/1994 |

OTHER PUBLICATIONS

European Brewery Convention Manual of Good Practice: Hops and Hop Products (1997), published by Getranke–Fachverlag Hans Carl, Nurnberg, pp. 41–47, 94–106, 140–141, 146–148, 150–152.

* cited by examiner

*Primary Examiner*—Reginald L. Alexander
(74) *Attorney, Agent, or Firm*—Hayes Soloway P.C.

(57) ABSTRACT

Iso-α-acids and reduced iso-α-acids in their free acids states are converted into mobile resins by the addition of concentrated solutions of alkali metal hydroxides. The products may be used in brewing for the bittering of beer and are most effectively used in an apparatus that automatically blends the product with water and injects the resultant, aqueous solution into beer.

5 Claims, 1 Drawing Sheet

BITTERING OF BEER

CROSS REFERENCE TO RELATED APPLICATIONS

This application claims benefit of U.S. Provisional Application Ser. No. 60/215,408, filed Jun. 30, 2000.

FIELD OF THE INVENTION

This invention relates to improvements in products prepared from hop extracts and used in the bittering, foam improvement and light stabilising of beer, and also in the methods by which these products are used, particularly for the post-fermentation bittering of beer.

BACKGROUND

Amongst the many types of compounds present in hops that are useful to brewers is a class of resinous compounds known as the α-acids. These compounds are primarily responsible for the bitterness of beer, being converted during wort boiling to their isomerized forms, known as iso-α-acids (Formula 1). The iso-α-acids are bitter and contribute also to the foam quality of the beer. Unfortunately, the conversion of α-acids to iso-α-acids in the wort kettle is rather inefficient and there are also subsequent losses of the iso-α-acids during the fermentation of the wort. Consequently, many brewers use preparations of iso-α-acids in forms that can readily be added to already fermented wort, thereby greatly increasing the utilisation of the original α-acids. These preparations can be efficiently manufactured from hop extracts, particularly from extracts prepared using liquid or supercritical carbon dioxide ($CO_2$), and provide an easy and cheap way for the brewer to control the bitterness of beer. Although other preparations have been described, the normal form in which these iso-α-acids are made commercially available is as an aqueous solution of the potassium salts, most commonly as a slightly alkaline solution containing 30% of actual iso-α-acids by weight (i.e. 300 g per kg) or weight/volume (i.e. 300 g per liter) of the iso-α-acids.

Subsequent to the introduction of iso-α-acids solutions for post-fermentation bittering, a range of products was developed in which the iso-α-acids were converted to different forms of chemically reduced derivatives. These derivatives are also bitter, but the degree of bitterness varies from that of the iso-α-acids. Differences are also apparent in their ability to promote and modify the characteristics of beer foam. The commercially available, reduced forms of iso-α-acids also have the further property of resisting the light-induced breakdown of the iso-α-acid molecule that is a key factor in the development of "lightstruck" or "skunky" flavors in beers exposed to sunlight or some forms of artificial light. Hence, these chemically reduced compounds are also often used as the sole bittering agents in the preparation of beers that are sold in clear glass bottles.

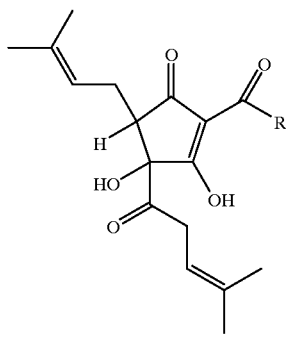

(1)

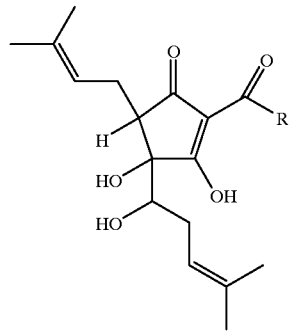

(2)

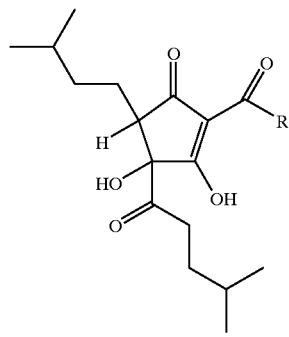

(3)

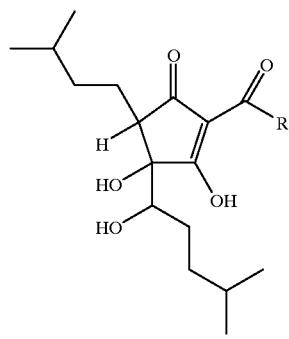

(4)

Three types of reduced iso-α-acids are commercially available. These are the ρ-iso-α-acids (alternatively written as rho-iso-α-acids, Formula 2), the tetrahydroiso-α-acids (Formula 3) and the hexahydroiso-α-acids (Formula 4). (See European Brewery Convention Manual of Good Practice: Hops and Hop Products (1997), publ. by Getränke-Fachverlag Hans Carl, Nürnberg). Many different methods for the preparation of these compounds have been described, but a common feature of the manufacture of ρ-iso-α-acids is that they are prepared via reduction of iso-α-acids with an alkali metal borohydride, normally sodium borohydride. Tetrahydroiso-α-acids, on the other hand, are invariably made via catalytic reduction using a precious metal catalyst, commonly palladium on carbon, and hydrogen gas. Several different processes for the production of tetrahydroiso-α-acids have been described, and the starting material may be α-acids, iso-α-acids or even β-acids (substances that form an analogous sequence of compounds to the α-acids, but contribute little to the beer in normal brewing). Hexahydroiso-α-acids are prepared either by catalytic hydrogenation of ρ-iso-α-acids, or else by chemical reduction of tetrahydroiso-α-acids using an alkali metal borohydride. Tetrahydroiso-α-acids are substantially more bitter than are iso-α-acids; hexahydroiso-α-acids are also more bitter, but rather less so, while ρ-iso-α-acids are actually less bitter. In terms of foam enhancement, when compared on an equivalent bittering basis hexahydroiso-α-acids are generally considered the most effective, followed by the tetrahydroiso-α-acids. The iso-α-acids and ρ-iso-α-acids have similar, but substantially less foam enhancing effects when compared in this way. Worldwide, the particular combination of bittering and foam stabilising properties shown by the tetrahydroiso-α-acids has made this form of reduced iso-α-acid especially popular, either as a partial replacement for normal iso-α-acids in the production of beers having improved foam characteristics or for the brewing of light-stable beers.

Because they are sufficiently soluble in wort, ρ-iso-α-acids are often used via direct addition to the kettle as well as by addition to beer. Commonly, like iso-α-acids, they are available commercially as an aqueous, slightly alkaline solution at about 30% strength. Such solution is normally used, as are corresponding solutions of iso-α-acids, by dilution into demineralized water and subsequent injection into beer, though it is possible to make direct injections of the product itself if steps are taken to ensure sufficiently vigorous and rapid mixing. A concentrated form of this product is also available, in which the ρ-iso-α-acids are also in the potassium salt form, but at about 60% concentration. Such a composition is described in our co-pending U.S. provisional patent application No. 60/215,408, filed Jun. 30, 2000. It is an object of this invention to enable such a concentrated and necessarily rather viscous preparation of ρ-iso-α-acids to be used not only as a kettle additive but also, through provision of suitable means, as a post-fermentation additive or even as an in-line or direct kettle wort additive, there being no equipment presently available that is designed to facilitate such use.

Tetrahydro- and, particularly, hexahydroiso-α-acids are inherently less soluble than are iso-α-acids and ρ-iso-α-acids. For this reason, tetrahydroiso-α-acids are commonly sold as a 10%, slightly alkaline aqueous solution of their potassium salts. Similarly, preparations of hexahydroiso-α-acids are also sold as relatively dilute solutions, or else a solubilizing agent such as propylene glycol must be added—a course of action that is considered unacceptable by most brewers. In the case of the tetrahydroiso-α-acids, Ting, in U.S. Pat. No. 5,874,633, described an improved manufacturing process whereby an aqueous, alkaline solution having a concentration of up to 45% could be obtained. However, Ting also reported (in column 4, lines 1–7) that, though the effect was reversible, this single phase solution would soon separate into two phases of distinctly different composition at temperatures below 28° C. Thus it may be expected that in most instances Ting's solution would not be physically stable when stored at ambient temperatures, and certainly not at the lower temperatures of a brewery cellar or coldstore. Clearly, it is inconvenient and more costly to use dilute or non-homogeneous solutions, and for this reason John Paul Maye in U.S. Pat. Nos. 5,583,262 & 5,624,701 describes the preparation of dry salts of isomerized and reduced isomerized α-acids, which he claims to enable a reduction of costs because of the greatly reduced weight of material requiring to be shipped to the customer. However, it is obvious that the provision of dry, crystalline or powdery substances containing less than 2% moisture (as is indicated by Maye) requires extra work to be done in the brewery, since the materials must first be weighed out and then dissolved into water before they can be used. Furthermore, Maye's process for the production of these salts requires one to start with an aqueous solution of the iso-α-acids or reduced iso-α-acids, the water being subsequently removed by any one of a number of different methods. It is one of the further advantages of our invention to provide a means whereby such isomerized substances can be converted into highly concentrated yet fluid and readily useable forms from their free acid state without the need first to prepare such relatively dilute solutions, such forms being conveniently used to bitter wort or beer in ways that we later describe. Many brewers prefer to add bittering compounds to their worts rather than to the subsequent beer, because in this way they obtain some useful protection from Gram positive spoilage organisms whose activity is inhibited in the presence of isomerized α-acids of all types. However, direct addition of either tetrahydro- or hexahydro-iso-α-acids to the brewery kettle is not recommended, though may be occasionally practised, since the poor solubility of these compounds results in excessive losses due to precipitation into the trub. Nevertheless, it is an additional benefit of our invention that the concentrated products whose manufacture we describe are also particularly suitable for addition to the kettle, should the brewer so desire.

It is common practice when making a light-stable beer to use both ρ-iso-α-acids and tetrahydroiso-α-acids or hexahydroiso-α-acids as the bittering agents, the normal reason being to avoid producing a beer of the correct bitterness but that has an excessively stable foam. In U.S. Pat. No. 5,200,227, Guzinski & Stegink describe the production of stable, single phase, aqueous solutions of mixtures of two or more different types of isomerized α-acids. By means of preparing such mixtures, Guzinski & Stegink demonstrated that the amounts of tetrahydro- or hexahydroiso-α-acids that could be held in solution could be increased above the individual solubility limits of these types of compounds when prepared as aqueous alkaline solutions by themselves. This phenomenon was ascribed to an unexpected cosolvent effect. However, these authors also showed that, above certain limits, such mixtures were not physically stable and would form two phases, stating (in column 6, lines 30–34) that ". . . there is an upper limit of concentration, at which the cosolvent effect is inoperative. This limit, for practical purposes, is about 45% by volume, and preferably the preparations are between 25% and 40% by volume in total concentration of iso-alpha acids.". Surprisingly, we have discovered that we are in fact able to readily prepare mixtures of different types of isomerized α-acids at much higher concentrations that are nonetheless homogeneous, have fluidity and therefore ideally suited to the working of our invention.

BRIEF SUMMARY OF THE INVENTION

It is an object of the present invention to provide a means whereby the advantages of a product having a high concentration of iso-α-acids or reduced iso-α-acids, particularly of tetrahydroiso-α-acids, may be utilised in such a way that these advantages are not compromised by, for example, the need to first of all dissolve a solid compound in water before it can be used. We find that we can readily prepare such products by taking iso-α-acids or reduced iso-α-acids in their naturally acidic and resinous form, heating until mobile and blending into them an approximately equivalent molar amount of concentrated, preferably near saturated, alkali metal hydroxide solution. By this means, we find that we can prepare the alkali metal salt of the isomerized α-acids in a highly concentrated, essentially homogeneous, and yet fluid form. A small amount of water also may be added in order to standardise the product and/or to reduce its viscosity at ambient temperature such that it remains fluid, but insufficient to cause practically significant separation of aqueous and resinous phases. That we can do this in the case of the tetrahydroiso-α-acids is particularly unexpected in view of the aforementioned observations of Ting in U.S. Pat. No. 5,874,633.

Our invention also comprises an apparatus for the direct injection of isomerized and/or reduced isomerized α-acids into wort or beer, which apparatus takes as a feedstock one or more highly concentrated preparations of the alkali metal salts of the aforesaid isomerized or reduced isomerized α-acids, blends these salts with demineralised or softened water and directly injects the resultant, diluted solution into the beer. In another aspect of the invention a means is provided for the manufacture of highly concentrated, homogeneous preparations of iso-α-acids, tetrahydroiso-α-acids and hexahydroiso-α-acids in their alkaline metal salts form, most preferably as their potassium salts, such preparations having a fluid consistency that is conveniently improved by heating. In addition, we provide means for the preparation of mixtures of different forms of iso-α-acids and reduced iso-α-acids, including mixtures containing ρ-iso-α-acids.

BRIEF DESCRIPTION OF THE DRAWINGS

The invention will be further described with reference to the accompanying drawings, wherein like numerals depict like parts, and wherein.

DETAILED DESCRIPTION OF PREFERRED EMBODIMENTS

Figure 1:
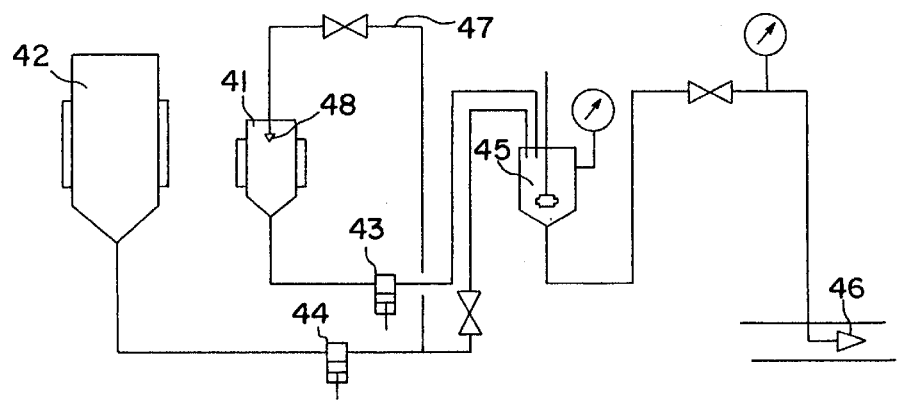
FIG. 1 is a flow diagram illustrating one embodiment of the present invention.

FIG. 1 illustrates one preferred embodiment of a means for practising our invention. It will be understood that in the description of the working of the depicted apparatus, and also elsewhere in our text, the term "iso concentrate" is taken to mean a concentrated, essentially homogeneous mixture of the alkali metal salts of iso-α-acids, or of reduced iso-α-acids, or of any mixture containing different types of these substances in which the total content of such substances is concentrated and in excess of about 40% by weight as measured by HPLC. It will further be understood and apparent to those skilled in the art that in the working of the aforementioned apparatus, described below, there may be added other useful items such as valves, vents, gauges and the like which may better facilitate the operation of the apparatus but which do not substantially alter the basic principles of our invention.

A preparation of iso concentrate is placed in vessel 41. This vessel is equipped with a known means for heating the contents, such means including, for example, a jacket for circulating hot water, an electric heating blanket, an electric hot plate or an internal heating element. A second, larger vessel 42 is similarly equipped and contains water, particularly demineralized or softened water. This second vessel may conveniently be between about 5 and 100 times larger than vessel 41, the relative size being related to the desired concentration of diluted iso concentrate solution to be injected into the wort or beer such that sufficient water is provided for the dilution of all of the iso concentrate in vessel 41. By means of adjustable dosing pumps 43 and 44, the hot water and iso concentrate are continuously pumped into closed pressure vessel 45, this vessel being equipped with known means for vigorously agitating the contents of the vessel. In this vessel, which is optionally also equipped with known means for heating its contents, the iso concentrate is rapidly dissolved, the pump rates being adjusted such as to produce a solution of known concentration that is preferably substantially below the solubility limit for the iso concentrate at the set temperature. For example, for iso-α-acids or ρ-iso-α-acids, a suitable concentration would be between 2 and 20% by weight, whereas for the less soluble tetrahydro- and hexahydroiso-α-acids suitable concentrations are in the range of 0.5–5% by weight. The diluted solution in vessel 45 is then injected via nozzle 46 into the beer, preferably into a wort or beer main while said wort or beer is being transferred from one vessel to another. Typically, the pump rates will be set such that the transfer of the iso concentrate into the wort or beer will take place over at least 70% of the time for which said wort or beer passes through the wort or beer main, and in the case of beer commonly, but not necessarily, before a filtration stage. Dosing pumps 43 and 44 may be of any known types that are suitable for handling, respectively, the relatively viscous iso concentrate and water, but must clearly be capable of accurately metering the two fluid streams against a high pressure. The generated pressure will be a function of various factors. Particularly, it will depend upon the existing pressure in the wort or beer main, the pump rate, the temperature of the fluids and the construction of the injection nozzle 46. It is desirable that the injected solution be rapidly dispersed into the wort or beer, otherwise there may be a tendency for certain components of the iso concentrate to precipitate out of solution, thereby causing a haze that may not readily re-dissolve, and which in the case of wort may be lost in the precipitated trub or which in the case of beer may be lost during filtration. For this reason, it is already common practice in the practice of post-fermentation bittering to inject solutions of iso-α-acids and the like immediately before a beer main pump, and we would recommend this practice in respect of our present invention, too. That said, it is nevertheless desirable and preferred, though not necessarily essential, that the injection nozzle 46 be constructed such as to induce vigorous mixing of the diluted iso concentrate with the wort or beer. Since the required energy for such mixing derives from the pressure drop between the exit of the nozzle and the wort or beer stream, it follows that the pressure in vessel 45 must then be substantially greater than that of the wort or beer main, we expect of the order of 0.5 to 5 bar. It is therefore recommended that the construction of the nozzle be such as to facilitate creation of this pressure differential. Other desirable features of a good dosing system are shown in FIG. 1. For example, line 47 allows hot water from vessel 42 to be sprayed via nozzle 48 into vessel 41, so that residual iso concentrate in vessel 41 at the end of the run may be displaced out of this vessel and into vessel 45, and from there to the wort or beer, thereby ensuring that the previously measured amount of iso concentrate is wholly transferred to the wort or beer and at the same time ensuring that the pipelines are cleared of material that might subsequently clog the lines, the valves or nozzle 46. (Such clogging is most likely to occur in post-fermentation dosing of beer, when the temperature of the lines or nozzle falls to the cellar or beer main temperature).

Figure 2:
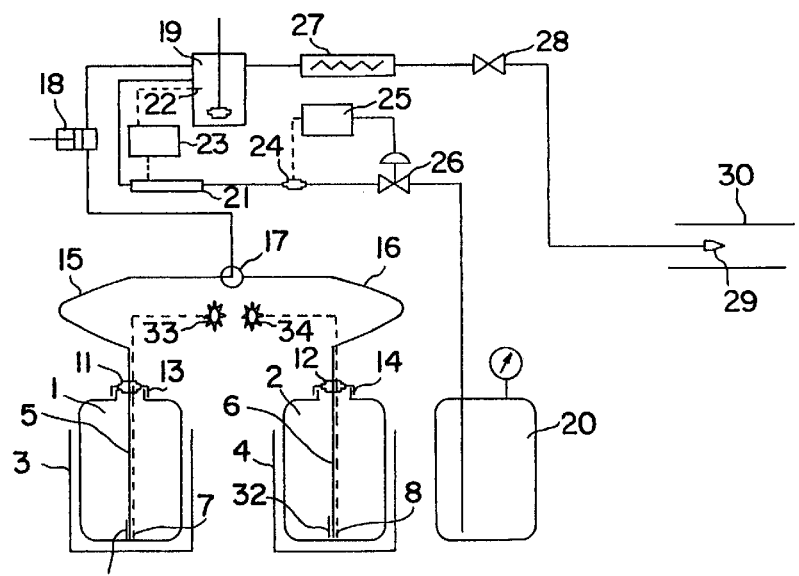
FIG. 2 is a flow diagram illustrating another embodiment of the present invention.
Figure 3:
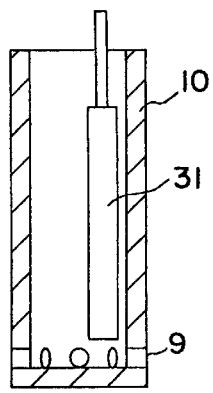
FIG. 3 is a side elevational view, in cross section, showing details of a dip pipe in accordance with a preferred embodiment of the invention.

Iso concentrate is conveniently supplied in plastic containers, typically holding 20 kg of product. Suitable containers would be round buckets equipped with lids and pull out spouts, or square polypropylene or high density polyethylene containers with screw tops. In a variation of the above scheme for dosing iso concentrate, illustrated in FIG. 2, the maximum advantage of the ability to work with iso concentrate is taken by enabling the brewer to use the iso concentrate directly from the container. Item 1 in FIG. 2 is a square container of iso concentrate from which the screw cap has been removed. The container rests inside an insulated, electrically heated well 3 that can be set to maintain the temperature of the contents above the ambient temperature of a beer cellar in which the apparatus is operated. A second container 2 is similarly placed inside a heating well 4 that is essentially identical to well 3, but may optionally be set to control at a different temperature. Removable dip pipes 5 & 6 are inserted into the two containers and have attached temperature sensors 7 & 8. The construction of the two wells is such that the containers preferably are held at a slight angle from the vertical so that the contents of each will drain to one side, at which points are situated the ends of dip pipes 5 & 6. These dip pipes are held in place by adjustable mountings 11 & 12 within caps 13 & 14 that are screwed onto the containers in place of the original caps supplied with the container. These (identical) mountings are designed such that the pipes can be adjusted to exactly reach to the bottom of the containers. In one suitable embodiment of our invention, pipes 5 & 6 have closed ends, but product is allowed to enter these pipes through holes 9 drilled into the sides 10 of the pipes as shown in FIG. 3. Dip pipes 5 & 6 are attached to flexible pipe sections 15 & 16, which allow the dip pipes to be easily removed from the containers. During operation, iso concentrate from one of the two vessels (say, for the sake of this description, container 1) passes out through its attached dip pipe, through motorised three way valve 17, and into self-priming, adjustable rate, positive displacement dosing pump 18. From pump 18, the suitably heated iso concentrate passes into mixing chamber 19, where it meets hot, demineralized or softened water from pressurized supply 20 and immediately begins to dissolve. The water is heated in-line by an electric heater 21, the temperature being controlled via temperature probe 22 and controller 23 and the flowrate by turbine flowmeter 24, controller 25 and control valve 26. The partially dissolved mixture of iso concentrate and water passes through static mixer 27 and thence via isolation valve 28 to nozzle 29 which is situated in beer main 30. Once the contents of container 1 are exhausted, air is drawn into dip pipe 9 causing sensor 31 to note a change in the conductance of the fluid, in turn triggering a signal to the drive motor of valve 17 which then changes position to start drawing iso concentrate from full container 2, at the same time automatically signalling (e.g. via light 33) the need to replace container 1.

As mentioned supra, many brewers prefer to make a light-stable beer by bittering with more than one type of reduced iso-α-acid. In principle, this may of course be achieved by first preparing a concentrate in which the different types of iso-α-acids are already blended together in the correct proportions, though with some desired mixtures it may not always be possible to do this and still achieve a product that is homogeneous and of otherwise suitable physical characteristics. Hence, in a further embodiment of our invention we allow for this possibility, at the same time increasing flexibility by allowing easy changes to be made to the proportions of the different types of iso-α-acids. This we do by adding the facility for handling a second third, or even fourth type of concentrate. In the above example of a dosing apparatus, the number of heated wells would therefore be increased to four, six or eight, these being arranged in pairs for handling containers filled with different types of iso concentrate, but otherwise exactly as shown for wells 1 and 2 in FIG. 2. The contents of the containers would be discharged via dip pipes, three way valves and dosing pumps as previously illustrated, the separate streams of the different products eventually meeting in the mixing chamber 18 or just prior to it.

As earlier mentioned, the different types of iso-α-acids have differing solubilities in aqueous solution. These solubilities are especially related to the pH of the solution, lower pH values reducing the solubility. At the relatively low pH values of beer, (typically from 3.8–4.5), unmodified iso-α-acids and ρ-iso-α-acids are the most soluble forms, followed by the tetrahydroiso-α-acids and, possibly least soluble of all, the hexahydroiso-α-acids. In all cases the solubilities in beer are very low, and normally measured in parts per million. Clearly, one may expect that the ease with which solutions of these substances can be mixed into worts or beers without forming transient or sometimes permanent precipitates is related to their inherent solubilities and the rapidity with which the added, near neutral to moderately alkaline solution of iso-α-acids is dispersed into the wort or beer. For this reason it is found to be easier to work with diluted solutions of these products, most particularly in the case of the tetrahydro- and hexahydroiso-α-acids, though some brewers do achieve satisfactory results with the direct injection of products such as 30% by weight solutions of chemically unmodified iso-α-acids. Given sufficiently vigorous mixing, the possibility therefore exists to dissolve more concentrated preparations of these materials, and in a further variation of our invention we allow of the possibility to directly inject fluid concentrates of iso-α-acids or reduced iso-α-acids in alkali metal salt form having much higher concentrations of these components and substantially as later described in our examples. In such a case, the apparatus required is fundamentally simpler, consisting in essence, for example, of the heating wells, three way valves, self-priming dosing pump and injection nozzle. Thus, in this particular embodiment we even do away with the need for a supply of demineralized or softened water and a mixing chamber. However, it has to be recognised that the convenience to be able to use direct injection of the concentrate necessarily requires extremely vigorous injection into the beer main.

Iso concentrates are readily and conveniently prepared from iso-α-acids or reduced iso-α-acids in their free acid, resinous state. This is achieved by first heating the acids to about 40–80° C. until conveniently fluid, vigorously stirring this mobile resin and slowly adding a calculated, near equimolar amount of suitably concentrated, preferably near-saturated, aqueous solution of an alkali metal hydroxide until a homogeneous, still fluid product is formed. Optionally, or sometimes of necessity, a small amount of water may be added before, during or after the addition of the alkali, but insufficient to cause the formation of separate phases in the final product. The mixture may then be cooled to ambient. This addition of water may be intended to bring the concentration of the product to a convenient, standardized value and/or may be added for the purpose of reducing its viscosity such that it is still sufficiently mobile to allow for easy use in our dosing apparatus. This concentration of iso-α-acids or reduced iso-α-acids clearly will be dependent upon the concentration and type of the alkali metal hydroxide solution used, and the amount (if any) of added water, but in any case should not be less than about 50% by weight. Potassium hydroxide solution at about 45% (w/w) is particularly favored as the neutralizing hydroxide, though other alkali metal hydroxides can be employed. Ideally, sufficient neutralizing hydroxide should be added to completely (100%) neutralize the acids, but not much above that, though a satisfactory product is possible in some cases at between 70 and 100%. On the other hand, excessive addition of hydroxide solution is to be avoided as it may lead to chemical instability. In most cases, the addition of alkali metal hydroxide solution should be such as to lead to a solution pH of between 5 and 12, most commonly between 7 and 11, when the product is dissolved into demineralized water at about 2% volume strength of the iso-α-acids or reduced iso-α-acids. The point at which addition of water is not possible without inducing a significant phase separation will depend on several factors and will vary according to the particular resin and the amount, type and strength of the added alkali. Hence, other than by experiment, it is not possible to determine exact limits for the maximum amount of water that can be tolerated in any particular type of product. In principle, the minimum possible amount of water will, of course, be determined by the strength of the alkali metal hydroxide solution and the degree of neutralization, but can never be less than about 3% by weight. However, at such low moisture content it is likely that the resin would be virtually solid and unsuitable for use. Consequently, it would then be necessary to add water, most probably to bring the moisture content to at least about 10% by weight.

Mixtures of two or more types of iso-α-acids may either be made by mixing the appropriate amounts of the free acid resins and then neutralizing and optionally diluting as described above, or by blending already formed preparations of the individual types of iso-α-acids. In these cases, the total amount of iso-α-acids of all types should be no less than about 50% by weight and the blend must also be such that it is homogeneous and does not undergo phase separation under normal storage conditions.

The effective working of our entire invention is naturally dependent upon the provision of suitable iso concentrate preparations and this aspect of our invention is more readily made apparent through the following examples.

EXAMPLE 1

Preparation of Tetrahydroiso-α-acids Concentrate 1.477 kg of a preparation of tetrahydroiso-α-acids (consisting of 85.8% tetrahydroiso-α-acids by HPLC and 94.8% by spectrophotometric analysis) was heated to 50° C. in a glass beaker and stirred vigorously at 700 RPM using a propeller type, stainless steel stirrer with controllable rate electric drive. A total of 341 ml of a 45% (w/w) aqueous solution of potassium hydroxide was added over a period of about 2 minutes. An aliquot of the mixture was found to have a pH value of 7.7 when diluted in water to a calculated strength of about 2% by weight. The product, a homogeneous, mobile resin, was allowed to cool and was found to be still moderately fluid at room temperature. On analysis it was found to contain 65.9% tetrahydroiso-α-acids by HPLC and 72.5% by the spectrophotometric method. When mixed with excess water at room temperature to give a calculated strength of 10% by weight (HPLC analysis), the product was found to dissolve readily and the resultant solution was found to have a pH value of 8.3.

EXAMPLE 2

Preparation of Iso-α-acids Concentrate 212.7 g of the free acid form of iso-α-acids (90.5% iso-α-acids by HPLC) was weighed into a glass beaker, warmed to 37° C., then stirred at 650 RPM using a 2.5" impeller). 45% (w/w) aqueous potassium hydroxide was added in stages, the pH of a diluted aliquot (at about 2% iso-α-acids content) of the mixture being taken at each stage so as to avoid over-titration of the iso-α-acids. The final pH, at 2% iso-α-acids, was 5.9. The resin was transparent and slightly mobile at ambient temperature, remaining transparent after refrigeration overnight. It had a concentration of iso-α-acids of 72.4% by HPLC. An aliquot of this product was then diluted with a small proportion of demineralized water to give a calculated 60% (by HPLC) iso-α-acids concentrate. Upon refrigeration, this lower concentration product first became opaque then, after several days, a separate, minor amount of aqueous phase was formed. Such separation was not, however, observed in the undiluted concentrate.

EXAMPLE 3

Preparation of a Concentrated Mixture of α-Iso-α-acids and Tetrahydroiso-α-acids Rho-iso-α-acids concentrate ("Rho concentrate") was first prepared by taking 1.627 kg of the free acid form of ρ-iso-α-acids and 160 mL of deionized water, warming to 45° C. in a 2 L glass beaker, stirring at 750 RPM (2.5" impeller) and by adding 354 mL of 45% (w/w) aqueous potassium hydroxide. The pH, at about 2% ρ-iso-α-acids, was 6.1. By HPLC analysis, it consisted of 53.9% reduced (rho-) iso-α-acids. Tetrahydroiso-α-acids concentrate ("Tetra concentrate") was next prepared by mixing hot (about 60° C.), free acid form tetrahydroiso-α-acids at 500 RPM (2.5" impeller) and then adding a total of 23.3 ml of 45% (w/w) aqueous potassium hydroxide. The pH at 2% tetrahydroiso-α-acids in demineralized water was 7.1. By HPLC analysis, this preparation consisted of 71.8% by weight of tetrahydroiso-α-acids. A blend of the above Rho and Tetra concentrates was then prepared by combining 46.16 g of Rho concentrate with 14.85 g of Tetra concentrate such that the ratio of ρ-iso-α-acids to tetrahydroiso-α-acids was 7:3. The pH of a diluted aliquot at a calculated 2% total of reduced isomerized α-acids (by HPLC), was 6.2.

EXAMPLE 4

Determination of Maximum Amount of Water Permissible in a Tetrahydroiso-α-acids Concentrate To aliquots of the tetrahydroiso-α-acids concentrate of Example 1 (65.9% tetrahydroiso-α-acids) were added various amounts of deionized water. These mixtures were then warmed to 50° C. and mixed. Samples were stored in glass containers kept at ambient temperature for about 2 weeks. Even the sample with the least amount of added water (2.0% by weight) had an aqueous layer on top of the main resinous phase, indicating that homogeneity cannot be maintained below a certain concentration of tetrahydroiso-α-acids (unless as a solution at a very much lower concentration).

EXAMPLE 5

Effect of Varying the Degree of Neutralization in the Preparation of a Tetrahydroiso-α-acids Concentrate 230 g aliquots of the free acid form of tetrahydroiso-α-acids were each warmed to 50° C., stirred at 650 RPM (2.5" impeller) and varying amounts of 45% (w/w) aqueous potassium hydroxide solution were added. An aliquot of each sample was diluted with water to a concentration of tetrahydroiso-α-acids of approximately 2% by HPLC. Observations of the resultant diluted samples, their pH value and the form and stability of the various concentrates are provided in Table 1.

TABLE 1

Effect of varying the proportion of added alkali hydroxide in the preparation of a tetrahydrosio-α-acids concentrate

| mL of 45% (w/w) KOH | Moles KOH Moles Tetra* | pH at 2% Tetra | Physical Form and Stability of Concentrate | Physical Form of Diluted Sample |
|---|---|---|---|---|
| (a) 49.0 | 1.04 | 6.6 | Viscous, just mobile | Resin Droplets + Aqueous Phase |
| (b) 51.0 | 1.09 | 7.1 | Viscous, just mobile | Resin Droplets + Aqueous Phase |
| (c) 52.0 | 1.11 | 7.4 | Viscous, just mobile (Least viscous preparation) | Translucent Resin |
| (d) 52.5 | 1.12 | 9.0 | Viscous, just mobile | Transparent Resin |

*Concentration of tetrahydroiso-α-acids (="Tetra") was by HPLC analysis.

After refrigeration for 3½ months, preparations (a) and (b) were still completely homogeneous, whereas preparation (c) had a thin layer of darker colored resin at the top and preparation (d) had a more distinct layer of darker resin plus a thin layer of aqueous phase.

EXAMPLE 6

Addition of Tetrahydroiso-α-acids Concentrates to Beer

In separate experiments, various types of iso-α-acids concentrates were sucked into a glass syringe, a hypodermic needle was placed on the syringe and then the syringe put into a 60° C. oven for a period of time to warm both the syringe and its contents. A weighed amount of each of the warm concentrates was injected into a 40 oz bottle of cold beer (Budweiser) having a replaceable screw cap and, after recapping, each bottle was transferred to a refrigerated warehouse, then vigorously swirled by hand about 8–12 times over the course of the next 2–3 days. The bottle was then opened and a 200 mL (approx.) sample of (cold) beer poured into a 400 mL glass beaker. After addition of one drop of n-octanol as an anti-foaming agent, the beer was then degassed by careful sonication using a small sonic bath. Next, each degassed beer sample was filtered through a sintered glass paper (Whatman GF/F paper) to remove any undissolved, reduced iso-α-acids or iso-α-acids. Finally, a 4 mL aliquot was diluted to a volume of 10 mL with methanol and 25 μL injected onto an HPLC column for analysis. Results are given in Table 2.

TABLE 2

Direct addition of different types of iso-α-acids concentrates to beer.

| Concentrate Added | Amount of Added iso-α-acids (ppm) | Increase in Iso-α-acids Content of Beer (ppm) | % of added iso-α-acids Dissolved into Beer |
|---|---|---|---|
| 1. Tetra concentrate of Example 1 | 11.1 | 1.7 | 15 |
| 2. Rho concentrate of Example 3 | 11.6 | 9.4 | 81 |
| 3. Iso concentrate of Example 2 | 10.9 | 9.4 | 86 |
| 4. Iso-60% concentrate | 12.9 | 12.0 | 93 |
| 5. Free acid form of iso-α-acids of Example 2 | 19.5 | 7.6 | 39 |
| 6. Rho/Tetra concentrate* (7:3) | | | |
| Rho: | 8.9 | 3.1 | 35 |
| Tetra: | 3.8 | 1.0 | 26 |
| 7. Iso/Tetra concentrate (1.25:1) | | | |
| Iso: | 8.2 | 3.8 | 46 |
| Tetra: | 6.5 | 2.1 | 32 |

*Not the Rho/Tetra concentrate of Example 3, but at the same compositional ratio.

Clearly, the efficiency with which the iso-α-acids are solubilized through simple addition into beer varies with the type of iso-α-acid and the form in which they are presented. The potassium salt forms of the normal iso-α-acids or of the ρ-iso-α-acids are much more easily dissolved than are those of the tetrahydroiso-α-acids. (Compare Items 2, 3 and 4 with Item 1). Indeed, it may be observed that quite high efficiencies of solubilization are achieved with the addition of concentrates of iso-α-acids even by simple, non-vigorous addition to beer in the described manner. Also, it may be seen from comparison of Items 3 and 4 with Item 5 that the ease with which iso-α-acids are solubilized is substantially greater when these acids are used in the form of highly concentrated solutions of their potassium salts prepared as per our invention. Naturally, it is to be expected that utilization efficiencies for iso concentrates of all types will be higher when these products are injected into beer using the dispensing apparatus of our invention, wherein it is ensured that the introduction of a heated product is achieved in a vigorous manner and optionally with the aid of prior dilution to further reduce the inherent viscosity.

EXAMPLE 7

Dissolution of Tetrahydroiso-α-acids Concentrate into Hot Water 150.4 g of deionized water were warmed to 60° C. in a tared, 400 ml beaker and stirred at 400 RPM with a 2.5" diameter, stainless steel impeller. 8.47 g of hot (about 60° C.) tetrahydroiso-α-acids concentrate (preparation (d) of Table 1, see Example 5) was then added quickly using a 10 cc plastic syringe fitted with a 16 gauge stainless steel needle. The Tetra concentrate dissolved almost immediately, producing a slightly opalescent solution. After 10 seconds of stirring, the beaker was re-weighed and the weight of the solution determined. The entire contents of the beaker were then filtered through a Whatman No. 1 paper and an aliquot of the filtrate taken for spectrophotometric analysis. Taking account of the measured concentration of Tetra in the filtrate (6.22% w/w) and the amount of tetrahydroiso-α-acids added as Tetra concentrate, it was concluded that essentially all (i.e. 100%) of the added tetrahydroiso-α-acids were transferred into the filtered solution.

This example clearly illustrates the rapidity and high efficiency with which Tetra concentrate can be dispersed and dissolved into water (such as, for example, by use of the dosing systems illustrated in FIGS. 1 & 2) to form an aqueous solution suitable for direct injection into wort or beer without the need of solvents or other undesirable chemical additives.

EXAMPLE 8

Dissolution of Rho/Tetra Concentrate into Hot Water

In the manner of Example 7, 150.1 g of deionized water were warmed to 60° C. in a tared, 400 ml beaker and stirred at 400 RPM using a 2.5" impeller. 12.14 g of hot (about 60° C.) Rho/Tetra concentrate (7:3 ratio of rho-iso-α-acids to tetrahydroiso-α-acids, 74.6% total by spectrophotometric analysis) were then quickly ejected into the water from a 10 cc plastic syringe via a 16 gauge needle. Stirring was continued for 10 seconds. The Rho/Tetra concentrate was noted to have dispersed almost immediately, albeit forming a somewhat turbid solution. A sample of this solution was then filtered through Whatman No. 5 paper (a more retentive grade than No. 1 paper) and an aliquot of the (opalescent) filtrate taken for spectrophotometric analysis. The measured, total concentration of rho-iso-α-acids+tetrahydroiso-α-acids in the filtrate was found to be 5.62% (w/w), comparing favorably with the theoretical concentration if all the added hop acids were to have been dissolved of 5.65% (w/w), thereby indicating that almost all of the isomerized hop resin acids were converted into a form suitable for efficient dissolution into wort or beer.

It will be apparent to those skilled in the art that certain variations can be made without departing from the spirit and intention of our invention. It is therefore to be understood that our invention is not to be limited by the description or scope of the examples given, but rather by the claims that follow and in which the term isomerized α-acids is taken to mean iso-α-acids, reduced iso-α-acids or any mixture of such substances.

What we claim is:

1. An apparatus for the direct injection of one or more concentrated preparations of isomerized α-acids into wort or beer, such apparatus containing the following elements:

(a) a heat source for heating each preparation of isomerized α-acids;

(b) a dispensing device for metering the flow of each preparation of isomerized α-acids into a pipeline; and (c) an injector fed by said pipeline for injecting the single or combined preparations of the heated, isomerized α-acids into wort or beer.

2. An apparatus as described in claim 1 wherein each of said preparations of isomerized α-acids are supplied directly from a disposable or returnable container.

3. An apparatus as described in claim 1 comprising two or more supplies of each of said preparations of isomerized α-acids, wherein said preparations of isomerized α-acids are each selectively metered from one of said supplies into said pipeline.

4. An apparatus according to claim 3 wherein said supplies are packaged in disposable or returnable containers.

5. An apparatus as described in claim 1 and further including a device or means for mixing and diluting the concentrated preparation of isomerized α-acids with hot water before injection into the wort or beer.

* * * * *